United States Patent
Nam et al.

(10) Patent No.: US 12,041,611 B2
(45) Date of Patent: Jul. 16, 2024

(54) MONITORING OF A CONTROL CHANNEL

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/996,615

(22) Filed: Aug. 18, 2020

(65) Prior Publication Data

US 2021/0058955 A1    Feb. 25, 2021

Related U.S. Application Data

(60) Provisional application No. 62/889,940, filed on Aug. 21, 2019.

(51) Int. Cl.
*H04W 72/20* (2023.01)
*H04L 1/08* (2006.01)
*H04W 76/28* (2018.01)

(52) U.S. Cl.
CPC .............. *H04W 72/20* (2023.01); *H04L 1/08* (2013.01); *H04W 76/28* (2018.02)

(58) Field of Classification Search
CPC ......... H04W 72/1278; H04W 72/1289; H04W 72/0406; H04W 72/042; H04W 72/044; H04W 72/0446; H04W 72/0453; H04W 76/28; H04W 24/08; H04W 24/10; H04W 52/0212; H04W 52/0216; H04W 52/0229; H04W 52/0251; H04W 52/0254; H04W 74/002; H04W 74/006; H04W 48/12; H04L 1/08
See application file for complete search history.

(56) References Cited

U.S. PATENT DOCUMENTS

| | | | |
|---|---|---|---|
| 2014/0295820 A1* | 10/2014 | Kim | H04W 52/0225 455/418 |
| 2017/0202054 A1 | 7/2017 | Rathonyi et al. | |
| 2019/0223164 A1 | 7/2019 | He et al. | |
| 2021/0168715 A1* | 6/2021 | Huang | H04W 72/0446 |
| 2021/0258962 A1* | 8/2021 | Kuang | H04W 72/042 |

(Continued)

FOREIGN PATENT DOCUMENTS

CN    109842937 A    6/2019

OTHER PUBLICATIONS

International Search Report and Written Opinion—PCT/US2020/070433—ISA/EPO—dayed Nov. 13, 2020.

(Continued)

*Primary Examiner* — Peter Chen
(74) *Attorney, Agent, or Firm* — Harrity & Harrity, LLP

(57) ABSTRACT

Various aspects of the present disclosure generally relate to wireless communication. In some aspects, a user equipment (UE) may receive, in a control channel, control information that provides an indication to skip monitoring of the control channel for a time duration. The UE may monitor the control channel according to the control information. Numerous other aspects are provided.

68 Claims, 8 Drawing Sheets

(56) References Cited

U.S. PATENT DOCUMENTS

2021/0314862 A1* 10/2021 Xu .................. H04W 52/0216

OTHER PUBLICATIONS

QUALCOMM Incorporated: "View on Group Common PDCCH", 3GPP Draft, 3GPP TSG-RAN WG1#88, R1-1702626_Group_Common_PDCCH, 3rd Generation Partnership Project (3GPP), Mobile Competence Centre, 650, Route Des Lucioles, F-06921 Sophia-Antipolis Cedex, France, vol. Ran WG1, No. Athens, Greece, Feb. 13, 2017-Feb. 18, 2017, Feb. 7, 2017, XP051221483, 4 Pages, Retrieved from the Internet: URL: http://www.3gpp.org/ftp/tsg_ran/WG1_RL1/TSGR1_88/Docs/ [retrieved on Feb. 7, 2017] 1. Introduction, Section 3.

Taiwan Search Report—TW109128228—TIPO—Nov. 2, 2023.

CATT: "Summary of UE Power Saving Schemes", 3GPP TSH RAN WG1 #96, R1-1903737, 3RD Generation Partnership Project (3GPP), Mobile Competence Centre, 650, Route Des Lucioles, F-06921, Sophia-Antipolis Cedex, France, vol. Ran WG1, No. Athens, Greece, February 25th-Mar. 1, 2019, pp. 1-26.

NEC: "Discussion on PDCCH-based Power Saving Signal/Channel for Wake Up", 3GPP TSG RAN WG1 #98, R1-1908435, 3RD Generation Partnership Project (3GPP), Mobile Competence Centre, 650, Route Des Lucioles, F-06921, Sophia-Antipolis Cedex, France, vol. Ran WG1, No. Prague, Czech Republic, Aug. 26-30, 2019, 4 Pages.

* cited by examiner

MONITORING OF A CONTROL CHANNEL

CROSS-REFERENCE TO RELATED APPLICATION

This Patent Application claims priority to U.S. Provisional Patent Application No. 62/889,940, filed on Aug. 21, 2019, entitled "MONITORING OF A CONTROL CHANNEL," and assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for monitoring of a control channel.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a UE, may include receiving, in a control channel, control information that provides an indication to skip monitoring of the control channel for a time duration; and monitoring the control channel according to the control information.

In some aspects, a UE for wireless communication may include memory and one or more processors operatively coupled to the memory. The memory and the one or more processors may be configured to receive, in a control channel, control information that provides an indication to skip monitoring of the control channel for a time duration; and monitor the control channel according to the control information.

In some aspects, a non-transitory computer-readable medium may store one or more instructions for wireless communication. The one or more instructions, when executed by one or more processors of a UE, may cause the one or more processors to receive, in a control channel, control information that provides an indication to skip monitoring of the control channel for a time duration; and monitor the control channel according to the control information.

In some aspects, an apparatus for wireless communication may include means for receiving, in a control channel, control information that provides an indication to skip monitoring of the control channel for a time duration; and means for monitoring the control channel according to the control information.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
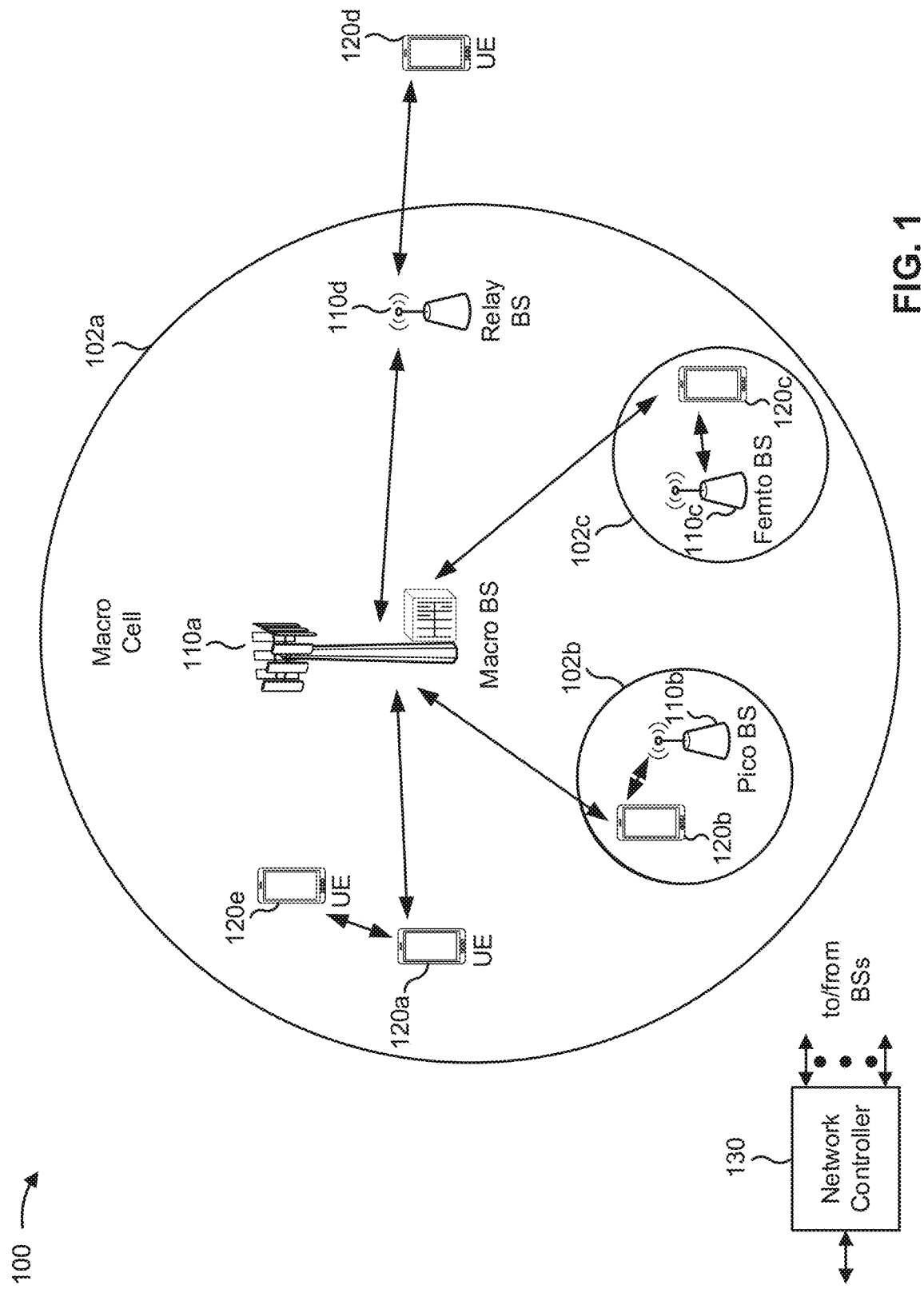
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
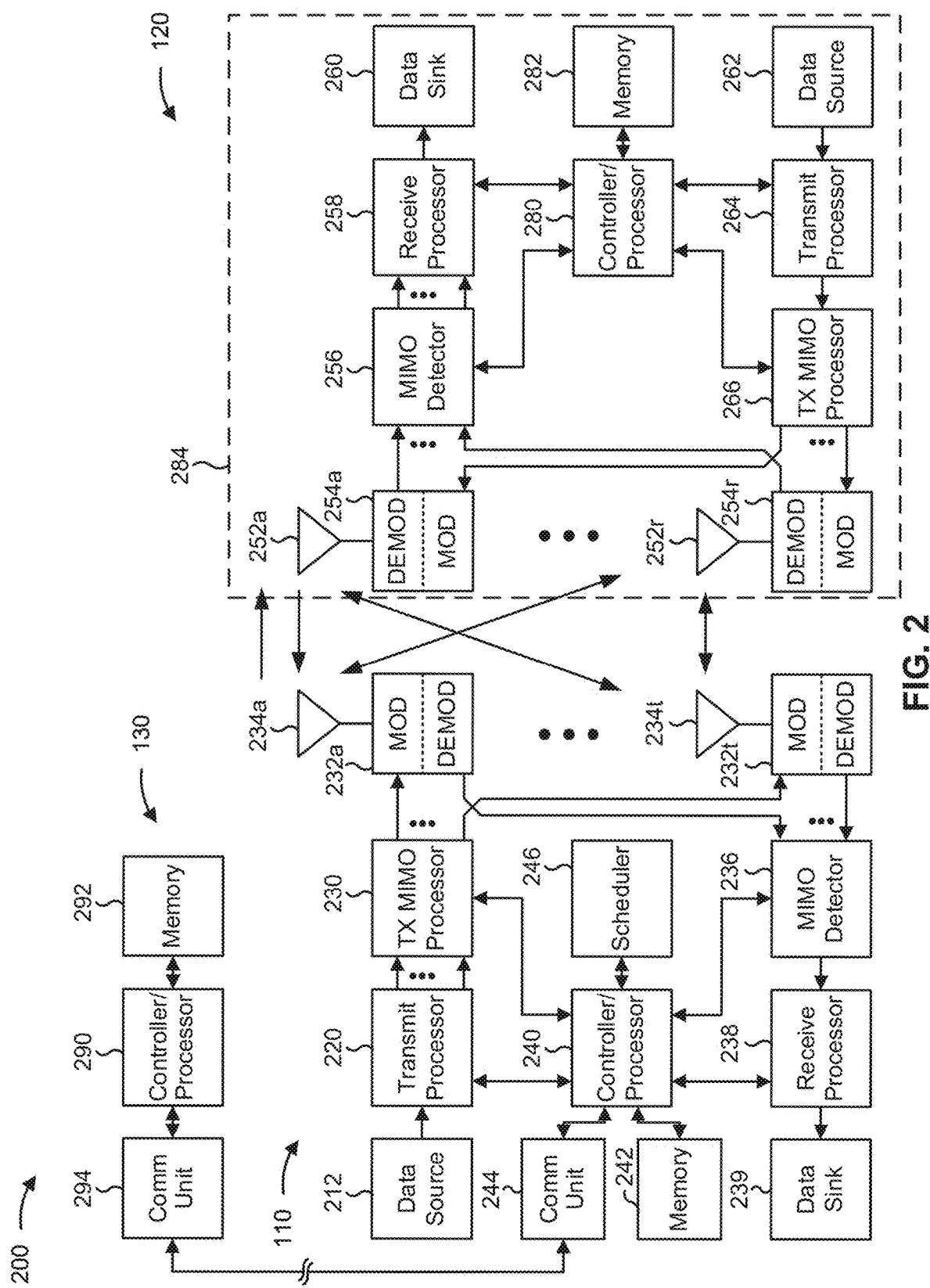
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with monitoring of a control channel, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 700 of FIG. 7 and/or other processes as described herein. A scheduler 246 may schedule UEs for data transmission on the downlink and/or uplink.

In some aspects, UE 120 may include means for receiving (e.g., using antenna 252, DEMOD 254, MIMO detector 256, receive processor 258, controller/processor 280, and/or memory 282), in a control channel, control information that provides an indication to skip monitoring of the control channel for a time duration, means for monitoring (e.g., using antenna 252, DEMOD 254, MIMO detector 256, receive processor 258, controller/processor 280, and/or memory 282) the control channel according to the control information, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
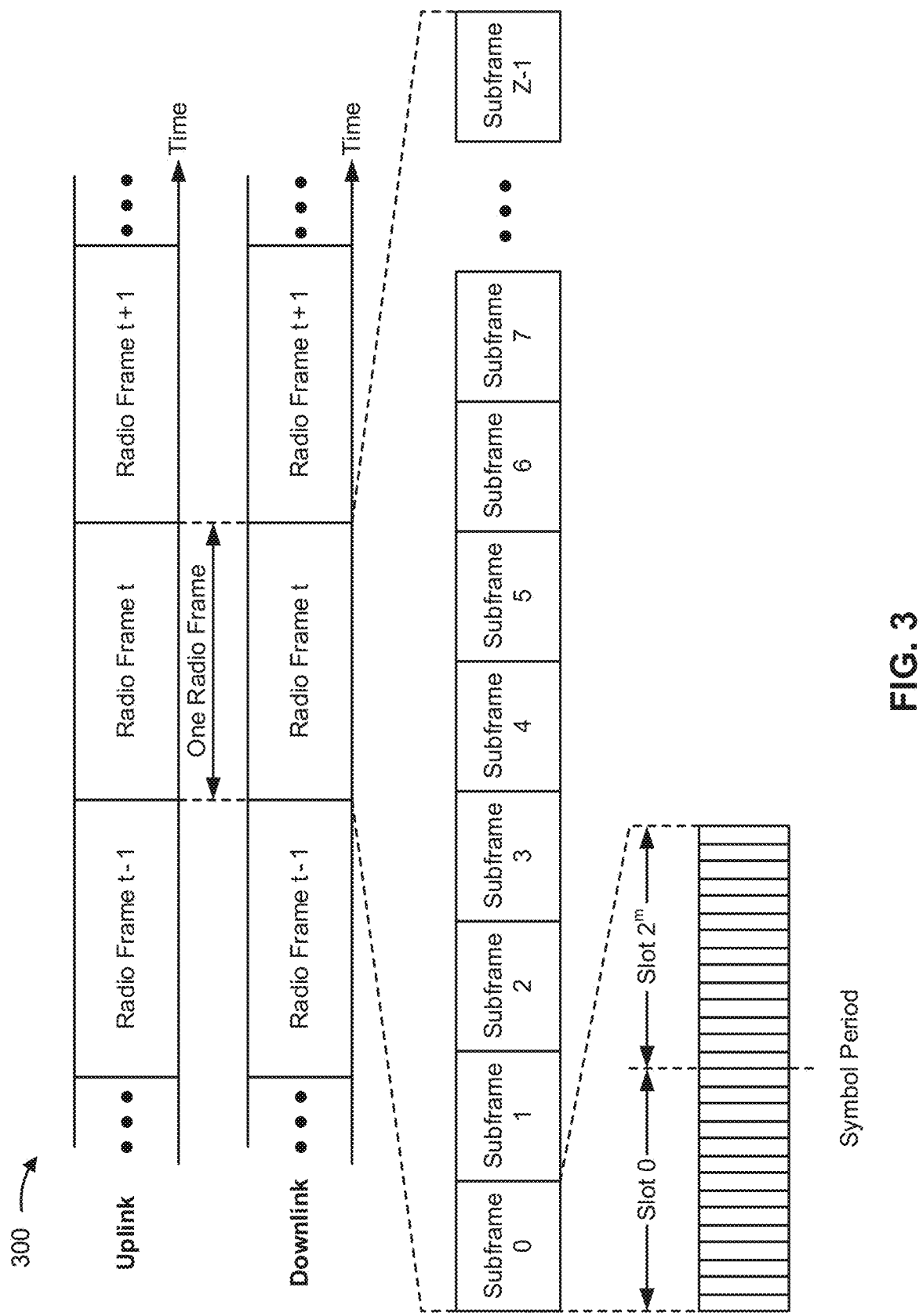
FIG. 3 is a block diagram illustrating an example of a frame structure in a wireless communication network, in accordance with various aspects of the present disclosure.

FIG. 3 shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3 may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

As indicated above, FIG. 3 is provided as an example. Other examples may differ from what is described with regard to FIG. 3.

Figure 4:
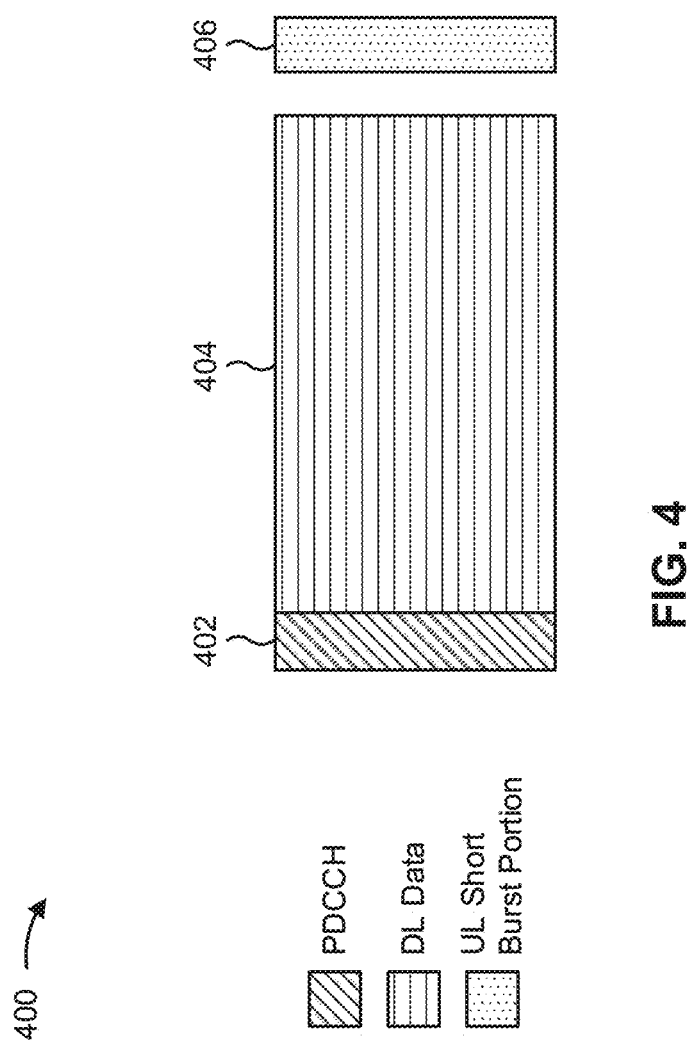
FIG. 4 is a diagram illustrating an example of a downlink (DL)-centric slot, in accordance with various aspects of the present disclosure.

FIG. 4 is a diagram 400 showing an example of a DL-centric slot or wireless communication structure. The DL-centric slot may include a control portion 402. The control portion 402 may exist in the initial or beginning portion of the DL-centric slot. The control portion 402 may include various scheduling information and/or control information corresponding to various portions of the DL-centric slot. In some configurations, the control portion 402 may be a physical DL control channel (PDCCH), as indicated in FIG. 4. In some aspects, the control portion 402 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, and/or the like), and/or the like.

The DL-centric slot may also include a DL data portion 404. The DL data portion 404 may sometimes be referred to as the payload of the DL-centric slot. The DL data portion 404 may include the communication resources utilized to communicate DL data from the scheduling entity (e.g., UE or BS) to the subordinate entity (e.g., UE). In some configurations, the DL data portion 404 may be a physical DL shared channel (PDSCH).

The DL-centric slot may also include an UL short burst portion 406. The UL short burst portion 406 may sometimes be referred to as an UL burst, an UL burst portion, a common UL burst, a short burst, an UL short burst, a common UL short burst, a common UL short burst portion, and/or various other suitable terms. In some aspects, the UL short burst portion 406 may include one or more reference signals. Additionally, or alternatively, the UL short burst portion 406 may include feedback information corresponding to various other portions of the DL-centric slot. For example, the UL short burst portion 406 may include feedback information corresponding to the control portion 402 and/or the data portion 404. Non-limiting examples of information that may be included in the UL short burst portion 406 include an acknowledgment (ACK) signal (e.g., a physical uplink control channel (PUCCH) ACK, a physical uplink shared channel (PUSCH) ACK, an immediate ACK), a negative acknowledgment (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 406 may include additional or alternative information, such as information pertaining to random access channel (RACH) procedures, scheduling requests, and various other suitable types of information.

As illustrated in FIG. 4, the end of the DL data portion 404 may be separated in time from the beginning of the UL short burst portion 406. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 4 is provided as an example. Other examples may differ from what is described with regard to FIG. 4.

Figure 5:
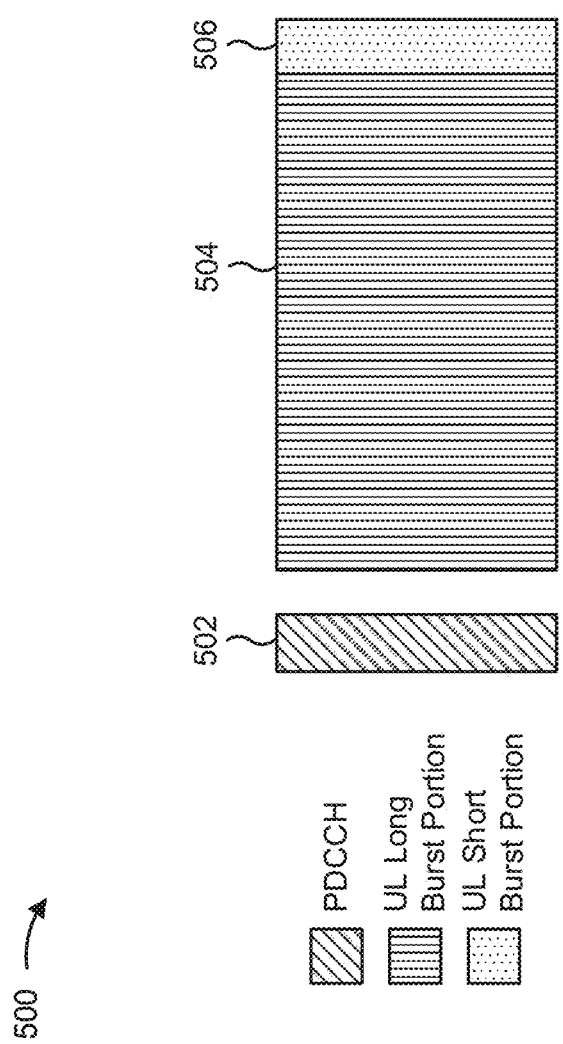
FIG. 5 is a diagram illustrating an example of an uplink (UL)-centric slot, in accordance with various aspects of the present disclosure.

FIG. 5 is a diagram 500 showing an example of an UL-centric slot or wireless communication structure. The UL-centric slot may include a control portion 502. The control portion 502 may exist in the initial or beginning portion of the UL-centric slot. The control portion 502 in FIG. 5 may be similar to the control portion 402 described above with reference to FIG. 4. The UL-centric slot may also include an UL long burst portion 504. The UL long burst portion 504 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 502 may be a PDCCH.

As illustrated in FIG. 5, the end of the control portion 502 may be separated in time from the beginning of the UL long burst portion 504. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 506. The UL short burst portion 506 in FIG. 5 may be similar to the UL short burst portion 406 described above with reference to FIG. 4, and may include any of the information described above in connection with FIG. 4. The foregoing is one example of an UL-centric wireless communication structure, and alternative structures having similar features may exist without necessarily deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 5 is provided as an example. Other examples may differ from what is described with regard to FIG. 5.

A UE may monitor a set of PDCCH candidates (e.g., a control channel element in each subframe) and attempt to decode each PDCCH candidate of the set in order determine whether the PDCCH candidate carries a scheduling grant for the UE. In some cases, the UE may monitor numerous PDCCH candidates without receiving a scheduling grant. As a result, the UE may consume power resources, processing resources, memory resources, and/or the like, monitoring PDCCH candidates that do not carry control information for the UE.

Some techniques and apparatuses described herein enable a UE to skip monitoring PDCCHs for an indicated time duration. For example, the UE may skip monitoring a PDCCH when the PDCCH is not carrying information for the UE. In this way, the UE may conserve power resources, processing resources, memory resources, and/or the like. Although some aspects are described in terms of a PDCCH, other types of control channels may be used in some aspects.

Figure 6:
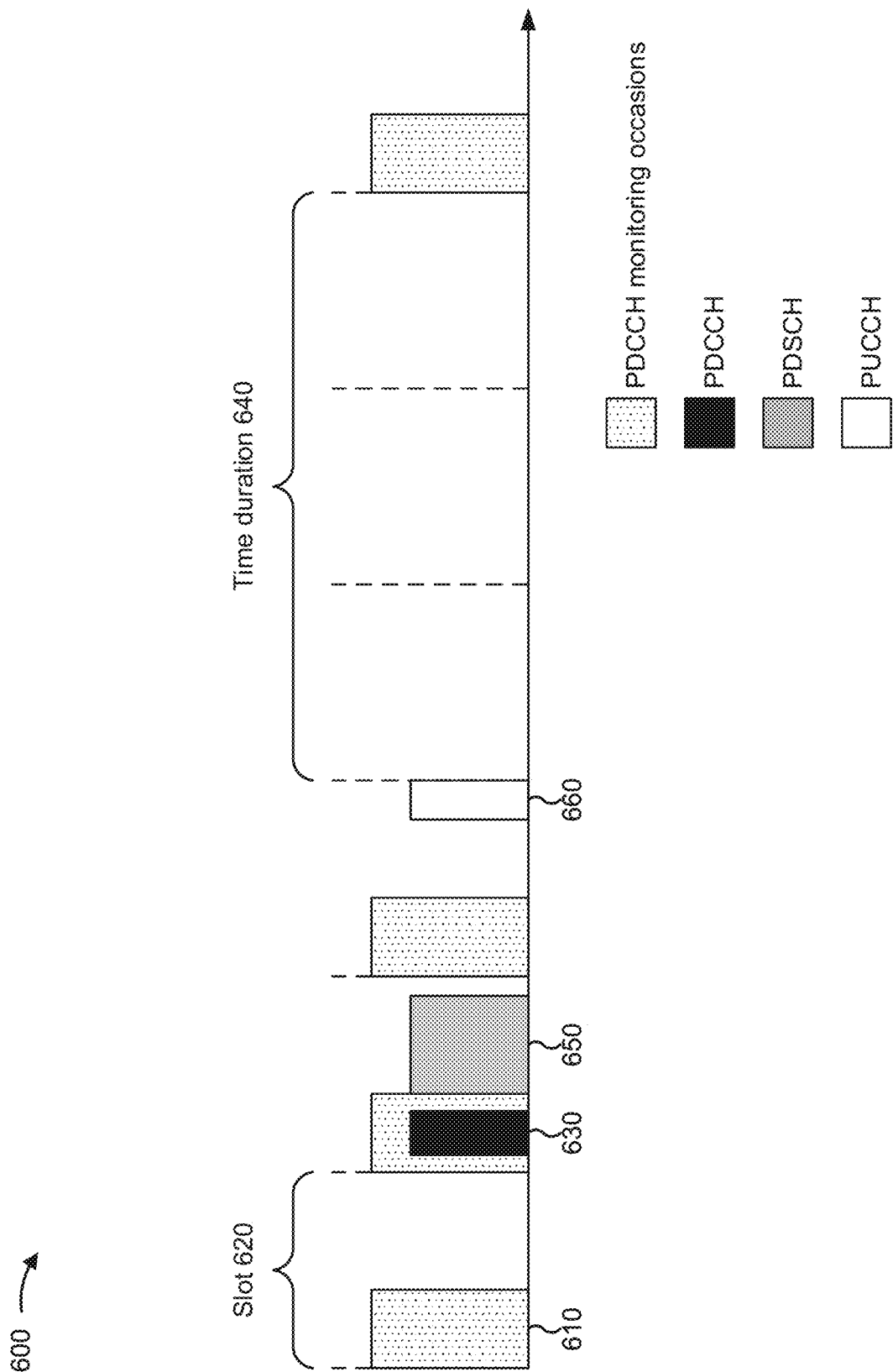
FIG. 6 is a diagram illustrating an example of monitoring of a control channel, in accordance with various aspects of the present disclosure.

FIG. 6 is a diagram illustrating an example 600 of monitoring of a control channel, in accordance with various aspects of the present disclosure. In accordance with FIG. 6, a UE (e.g., UE 120 and/or the like) may monitor for control information (e.g., control information transmitted by a B S) at fixed PDCCH monitoring occasions 610 that may occur in each slot 620. For example, the UE may attempt to decode a PDCCH in each PDCCH monitoring occasion 610. In some aspects, the UE may successfully decode a PDCCH 630 in a PDCCH monitoring occasion 610. The decoded PDCCH 630 may carry control information (e.g., downlink control information (DCI)) that is intended for the UE. For example, the PDCCH 630 may carry control information (e.g., scheduling information) that schedules a downlink transmission from a BS (e.g., BS 110 and/or the like) or an uplink transmission of the UE. In some aspects, the UE may successfully decode the PDCCH 630 during an active period of a discontinuous reception operation of the UE or during a continuous reception operation of the UE (e.g., when the UE is not configured for discontinuous reception).

In some aspects, the control information may provide an indication that the UE is to skip monitoring (e.g., refrain from monitoring) PDCCHs (e.g., skip one or more PDCCH monitoring occasions 610) for a particular time duration 640 (e.g., a skip duration). For example, the control information (e.g., DCI) may include a bit field that indicates the time duration 640 for which the UE is to skip monitoring PDCCHs. In some aspects, the time duration 640 may be one or more transmission time intervals (TTIs) (e.g., one or more slots, mini-slots, subframes, and/or the like). In some aspects, the UE may be configured with a set of time durations, and the control information may identify the time duration 640 from the set of time durations.

In some aspects, the BS may determine the time duration 640 for which the UE is to skip monitoring PDCCHs. The BS may determine the time duration 640 based at least in part on a quantity of UEs for which the BS is to provide control information. For example, the BS may determine the time duration 640 based at least in part on a quantity of UEs having data in a scheduling buffer of the BS, a quantity of data for transmissions in a scheduling buffer of the BS, and/or the like. Accordingly, the BS may transmit, and the UE may receive, in PDCCH 630, control information that provides an indication that the UE is to skip monitoring PDCCHs for the time duration 640, as described above.

The UE may receive, in a PDSCH 650, a downlink transmission from the BS as scheduled by the control information. The UE may transmit ACK or NACK feedback for the downlink transmission to the BS in a PUCCH 660 (e.g., as scheduled by the control information). In some aspects, the control information may schedule (e.g., provide an uplink grant) an uplink transmission from the UE to the BS in a PUSCH (not shown in FIG. 6).

In some aspects, the UE may monitor PDCCHs according to the indication to skip monitoring PDCCHs of the control information (and the BS may transmit further control information in a PDCCH according to the indication to skip monitoring PDCCHs). In some aspects, the UE may skip monitoring PDCCHs (e.g., skip monitoring one or more PDCCH monitoring occasions 610) for the time duration 640 indicated by the control information and starting from a particular starting point (e.g., a configured starting point or a starting point identified by the control information). For example, the UE may skip monitoring PDCCHs, for the time duration 640, starting from a next time period (e.g., symbol, slot, subframe, frame, TTI, and/or the like) after the control information is received (e.g., starting from a next symbol after receiving PDCCH 630). As another example, the UE may skip monitoring PDCCHs, for the time duration 640, starting from a next time period (e.g., symbol, slot, subframe, frame, TTI, and/or the like) after a control region (e.g., a control resource set (CORESET)) in which the control information is received (e.g., starting from a next symbol after a PDCCH monitoring occasion 610 in which PDCCH 630 is received). As a further example, the UE may skip monitoring PDCCHs, for the time duration 640, starting from a next time period (e.g., symbol, slot, subframe, frame, TTI, and/or the like) after receiving the downlink transmission scheduled by the control information (e.g., starting from a next symbol after receiving PDSCH 650).

As an additional example, the UE may skip monitoring PDCCHs, for the time duration 640, starting from a next time period (e.g., symbol, slot, subframe, frame, TTI, and/or the like) after transmitting the uplink transmission (e.g., in a PUSCH) scheduled by the control information (e.g., starting from a next symbol after transmitting in the PUSCH). In some aspects, the UE may skip monitoring PDCCHs, for the time duration 640, starting from a next time period (e.g., symbol, slot, subframe, frame, TTI, and/or the like) after a time offset (e.g., a configured time offset or a time offset identified by the control information) that follows transmitting the uplink transmission (e.g., in a PUSCH) scheduled by the control information. As shown in FIG. 6, in some aspects, the UE may skip monitoring PDCCHs, for the time duration 640, starting from a next time period (e.g., symbol, slot, subframe, frame, TTI, and/or the like) after transmitting acknowledgment or negative acknowledgment feedback (e.g., HARQ feedback) for the downlink transmission.

In some aspects, the UE may fail to decode the downlink transmission from the BS and transmit NACK feedback (e.g., in PUCCH 660) for the downlink transmission. In some aspects, the uplink transmission transmitted from the UE to the BS may fail. In such cases, the UE may receive new control information (e.g., indicating a HARQ process associated with the failed downlink or uplink transmission) that identifies a retransmission of the downlink transmission or the uplink transmission. To avoid a conflict between receiving the new control information and the time duration 640 for which the UE is to skip monitoring PDCCHs, the UE may monitor PDCCHs according to a skipping procedure. The UE may be configured to perform a particular skipping procedure. Additionally, or alternatively, the UE may be configured with a set of skipping procedures, and the control information may identify a particular skipping procedure that the UE is to perform.

In some aspects, according to a skipping procedure, the UE may skip monitoring PDCCHs for the time duration 640, and receive, after skipping monitoring PDCCHs, the new control information from the BS. For example, the UE may resume monitoring PDCCHs after the time duration 640 and receive the new control information (e.g., the UE may expect to receive a grant for a retransmission after the end of the time duration 640). Alternatively, according to a skipping procedure, the UE may monitor PDCCHs without skipping monitoring PDCCHs (e.g., the UE may ignore an indication to skip monitoring) in order to receive the new control information from the BS. For example, the UE may monitor PDCCHs, without skipping monitoring PDCCHs, after transmitting NACK feedback for the downlink transmission or during a particular time interval after transmitting the uplink transmission. The new control information, in addition to identifying a retransmission of the downlink transmission or the uplink transmission, may identify a new time duration for which the UE is to skip monitoring PDCCHs.

In some aspects, according to a skipping procedure, the UE may monitor PDCCHs (e.g., without skipping monitoring PDCCHs), during the time duration 640, according to a modified configuration (e.g., one or more modified parameters) relative to a configuration (e.g., one or more parameters) for monitoring PDCCHs outside of the time duration 640. For example, during the time duration 640, the UE may monitor PDCCHs using a less-frequent periodicity (e.g., monitor PDCCHs in every second slot 620, every third slot 620, and/or the like), and outside of the time duration 640, the UE may monitor PDCCHs using a more-frequent periodicity (e.g., monitor PDCCHs in every slot 620). As another example, during the time duration 640, the UE may monitor a lesser quantity of PDCCH candidates, and outside of the time duration 640, the UE may monitor a greater quantity of PDCCH candidates. As another example, during the time duration 640, the UE may monitor PDCCHs associated with one transmission type (e.g., one of downlink transmissions or uplink transmissions), and outside of the time duration 640, the UE may monitor for PDCCHs associated with more than one transmission type (e.g., both of downlink transmissions and uplink transmissions). As an example, if the UE transmitted NACK feedback for the downlink transmission from the BS (e.g., the UE is expecting a retransmission of the downlink transmission), the UE may monitor PDCCHs associated with downlink transmissions during the time duration 640.

In some aspects, according to a skipping procedure, the UE may discontinuously monitor PDCCHs during the time duration 640. For example, the UE may skip monitoring PDCCHs during a first time interval of the time duration 640. The first time interval may be associated with a first timer, such as a round-trip timer (e.g., associated with a duration of a round trip between the UE and the BS), which the UE may initiate upon transmitting NACK feedback for the downlink transmission or after transmitting the uplink transmission. Continuing with the previous example, the UE may monitor PDCCHs during a second time interval of the time duration 640 (e.g., after the first time interval). The second time interval may be associated with a second timer, such as a retransmission timer (e.g., associated with a duration needed for the BS to transmit the new control information), which the UE may initiate upon expiration of the round-trip timer.

The UE may be configured with a duration for the round-trip timer and/or the retransmission timer. In some aspects, a duration for the round-trip timer and/or the retransmission timer may correspond to (or may be different from) a duration for a round-trip timer and/or a retransmission timer configured for a discontinuous reception operation. In some aspects, the round-trip timer and/or the retransmission timer may be associated with a particular HARQ process (e.g., a particular HARQ process indicator).

In some aspects, the UE may receive the new control information before expiration of a configured duration for the second time interval. In such a case, the UE may terminate the retransmission timer and monitor PDCCHs according to the new control information (e.g., according to a new time duration indicated by the new control information). For example, the UE may monitor PDCCHs according to the new time duration and/or using a skipping procedure described above.

In some aspects, the UE may not receive the new control information during the second time interval. In such a case, the UE may resume skipping monitoring PDCCHs for a third time interval of the time duration 640 (e.g., after the second time interval and before expiration of the time duration 640). The third time interval may correspond to a remainder of the time duration 640 after the first time interval and the second time interval.

As indicated above, FIG. 6 is provided as an example. Other examples may differ from what is described with respect to FIG. 6.

Figure 7:
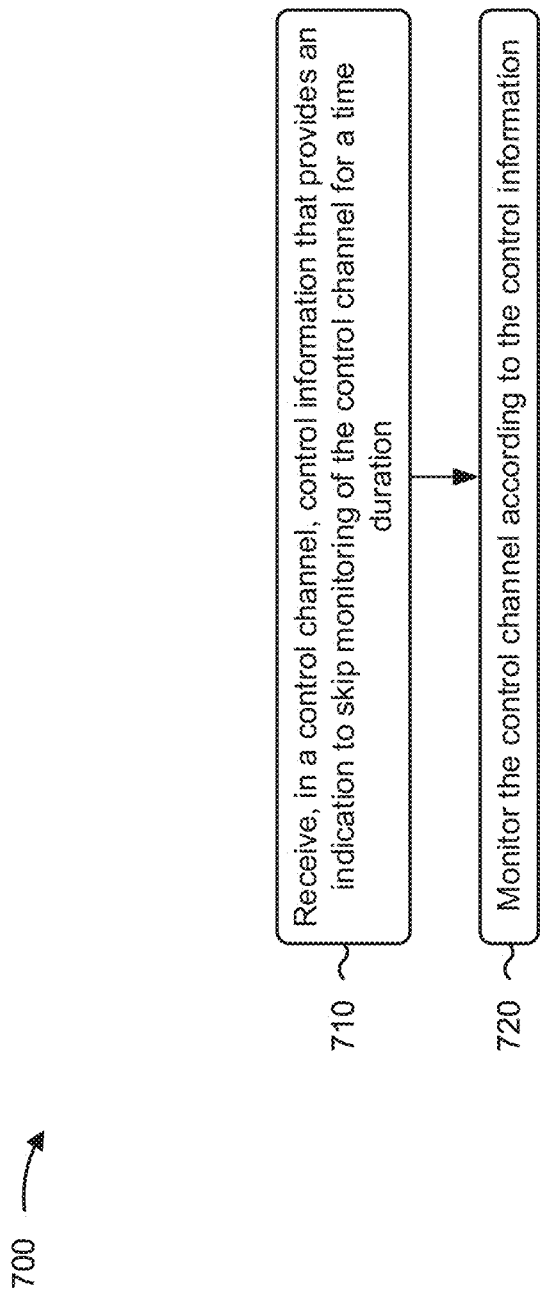
FIG. 7 is a diagram illustrating an example process performed, for example, by a UE, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with monitoring of a control channel.

As shown in FIG. 7, in some aspects, process 700 may include receiving, in a control channel, control information that provides an indication to skip monitoring of the control channel for a time duration (block 710). For example, the UE (e.g., using antenna 252, DEMOD 254, MIMO detector 256, receive processor 258, controller/processor 280, and/or the like) may receive, in a control channel, control information that provides an indication to skip monitoring of the control channel for a time duration, as described above.

As further shown in FIG. 7, in some aspects, process 700 may include monitoring the control channel according to the control information (block 720). For example, the UE (e.g., using antenna 252, DEMOD 254, MIMO detector 256, receive processor 258, controller/processor 280, and/or the like) may monitor the control channel according to the control information, as described above.

Process 700 may include additional aspects, such as any single aspect or any combination of aspects described below and/or in connection with one or more other processes described elsewhere herein.

In a first aspect, the control information is received during an active period of a discontinuous reception operation or during a continuous reception operation.

In a second aspect, alone or in combination with the first aspect, process 700 further includes skipping monitoring of the control channel for the time duration and starting from at least one of: a next time period after the control information is received; a next time period after a control region in which the control information is received; a next time period after receiving a downlink transmission scheduled by the control information; a next time period after transmitting an uplink transmission scheduled by the control information; a next time period after transmitting acknowledgment or negative acknowledgment feedback for the downlink transmission; or a next time period after a time offset that follows transmitting the uplink transmission.

In a third aspect, alone or in combination with one or more of the first and second aspects, the time duration is one or more transmission time intervals.

In a fourth aspect, alone or in combination with one or more of the first through third aspects, process 700 further includes skipping monitoring of the control channel for the time duration; monitoring the control channel after the time duration; and receiving, in the control channel, new control information that identifies a retransmission of a downlink transmission or an uplink transmission.

In a fifth aspect, alone or in combination with one or more of the first through fourth aspects, the control channel is monitored without skipping monitoring of the control channel in order to receive new control information that identifies a retransmission of a downlink transmission or an uplink transmission. In a sixth aspect, alone or in combination with one or more of the first through fifth aspects, the control channel is monitored without skipping monitoring after transmitting negative acknowledgment feedback for the downlink transmission or during a particular time interval after transmitting the uplink transmission. In a seventh aspect, alone or in combination with one or more of the first through sixth aspects, the new control information provides an indication to skip monitoring of the control channel for a new time duration.

In an eighth aspect, alone or in combination with one or more of the first through seventh aspects, the control channel is monitored, during the time duration, according to a modified configuration relative to a configuration for monitoring of the control channel outside of the time duration. In a ninth aspect, alone or in combination with one or more of the first through eighth aspects, the modified configuration modifies at least one of: a periodicity for monitoring the control channel; a quantity of control channel candidates that are to be monitored; or a transmission type of grants that are to be monitored in the control channel.

In a tenth aspect, alone or in combination with one or more of the first through ninth aspects, process 700 further includes skipping monitoring of the control channel during a first time interval of the time duration; and monitoring the control channel during a second time interval of the time duration. In an eleventh aspect, alone or in combination with one or more of the first through tenth aspects, the first time interval starts after transmitting negative acknowledgment feedback for a downlink transmission scheduled by the control information or after transmitting an uplink transmission scheduled by the control information.

In a twelfth aspect, alone or in combination with one or more of the first through eleventh aspects, process 700 further includes receiving (e.g., using antenna 252, DEMOD 254, MIMO detector 256, receive processor 258, controller/processor 280, and/or memory 282), during the second time interval, new control information that identifies a retransmission of a downlink transmission or an uplink transmission and provides an indication to skip monitoring of the control channel for a new time duration; and skipping monitoring of the control channel for the new time duration and before a configured expiration of the second time interval. In a thirteenth aspect, alone or in combination with one or more of the first through twelfth aspects, process 700 further includes skipping monitoring of the control channel during a third time interval of the time duration that is after the second time interval.

In a fourteenth aspect, alone or in combination with one or more of the first through thirteenth aspects, the first time interval is associated with a first timer and the second time interval is associated with a second timer. In a fifteenth aspect, alone or in combination with one or more of the first through fourteenth aspects, the first timer and the second timer are associated with a particular HARQ process. In a sixteenth aspect, alone or in combination with one or more of the first through fifteenth aspects, the first time interval and the second time interval are in accordance with a discontinuous reception configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
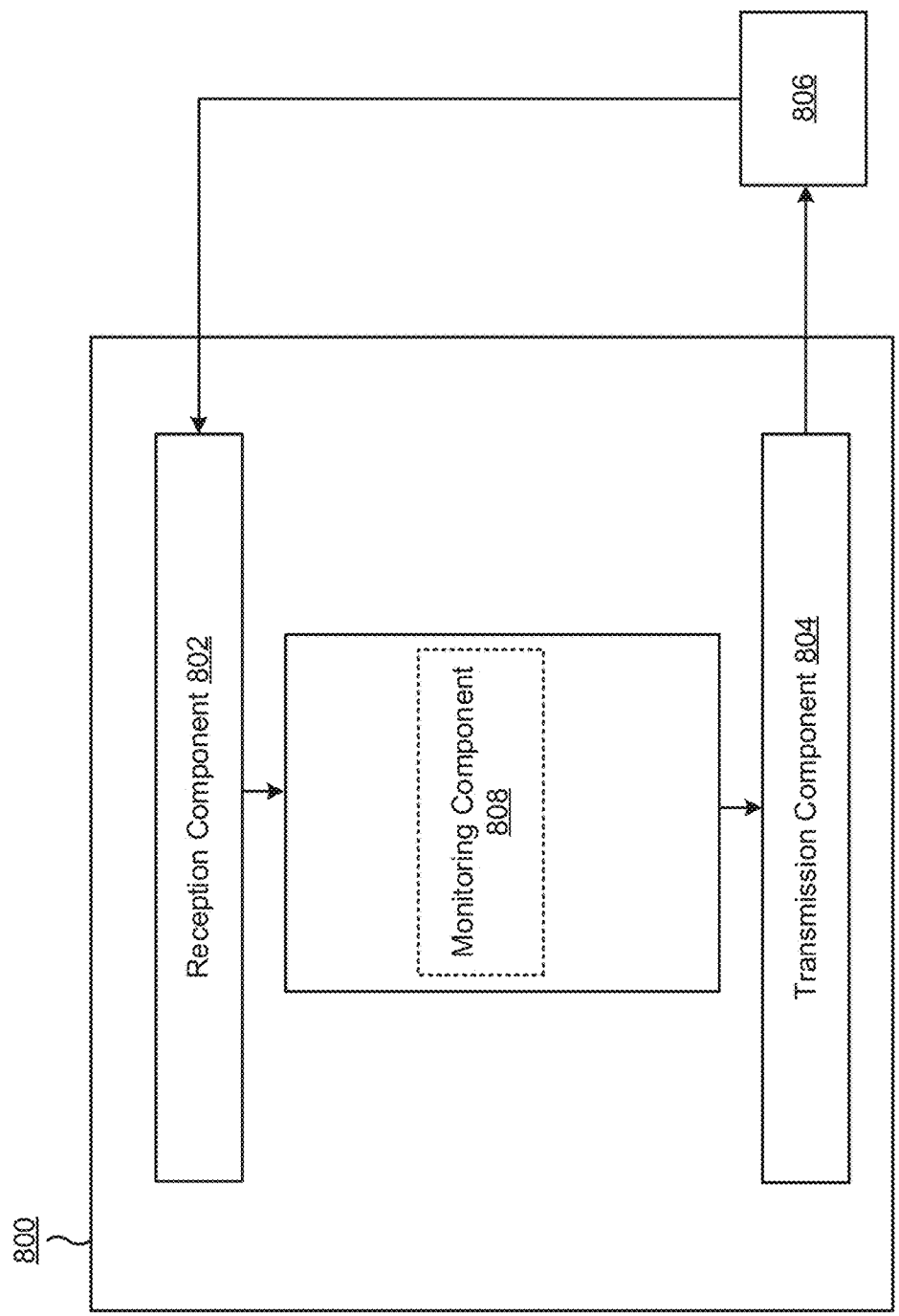
FIG. 8 is a block diagram of an example apparatus for wireless communication.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a monitoring component 808, among other examples.

In some aspects, the apparatus 800 may be configured to perform one or more operations described herein in connection with FIG. 6. Additionally or alternatively, the apparatus 800 may be configured to perform one or more processes described herein, such as process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be collocated with the reception component 802 in a transceiver.

In some aspects, the reception component 802 may receive, in a control channel, control information that provides an indication to skip monitoring of the control channel for a time duration. In some aspects, the monitoring component 808 may monitor the control channel according to the control information. For example, the monitoring component 808 may skip monitoring of the control channel for the time duration. In some aspects, the monitoring component 808 may include one or more antennas, a demodulator, a MIMO detector, a receive processor, a controller/processor, a memory, or a combination thereof, of the UE described above in connection with FIG. 2.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    receiving, in a control channel and from a network node, control information including a bit field that identifies a time duration, of a set of time durations, to skip monitoring of the control channel, wherein the UE is configured with the set of time durations;
    identifying, based at least in part on receiving the control information, the time duration of the set of time durations;
    skipping monitoring of the control channel during a first time interval of the time duration according to a skipping procedure, wherein the first time interval starts after transmitting negative acknowledgment feedback for a downlink transmission scheduled by the control information, and wherein the UE is configured with the skipping procedure; and
    monitoring the control channel during a second time interval of the time duration according the skipping procedure.

2. The method of claim 1, wherein the control information is received during an active period of a discontinuous reception operation or during a continuous reception operation.

3. The method of claim 1, further comprising monitoring the control channel starting from at least one of:
    a next time period after the control information is received;
    a next time period after a control region in which the control information is received;
    a next time period after receiving the downlink transmission scheduled by the control information;
    a next time period after transmitting an uplink transmission scheduled by the control information;
    a next time period after transmitting the negative acknowledgment feedback for the downlink transmission; or
    a next time period after a time offset that follows transmitting the uplink transmission.

4. The method of claim 1, wherein the time duration is one or more transmission time intervals.

5. The method of claim 1, further comprising:
    monitoring the control channel after the time duration; and
    receiving, in the control channel, new control information that identifies a retransmission of the downlink transmission or an uplink transmission.

6. The method of claim 5, wherein the new control information provides an indication to skip monitoring of the control channel for a new time duration of the set of time durations.

7. The method of claim 1, wherein the control channel is monitored, during the time duration, according to a modified configuration relative to a configuration for monitoring of the control channel outside of the time duration.

8. The method of claim 7, wherein the modified configuration modifies at least one of:
    a periodicity for monitoring the control channel;
    a quantity of control channel candidates that are to be monitored; or
    a transmission type of grants that are to be monitored in the control channel.

9. The method of claim 1, further comprising:
    receiving, during the second time interval, new control information that identifies a retransmission of the downlink transmission or an uplink transmission and provides an indication to skip monitoring of the control channel for a new time duration of the set of time durations; and
    skipping monitoring of the control channel for the new time duration and before a configured expiration of the second time interval.

10. The method of claim 1, further comprising skipping monitoring of the control channel during a third time interval of the time duration that is after the second time interval.

11. The method of claim 1, wherein the first time interval is associated with a first timer and the second time interval is associated with a second timer.

12. The method of claim 11, wherein the first timer and the second timer are associated with a particular hybrid automatic repeat request process.

13. The method of claim 11, wherein the first timer is a round trip timer associated with a duration of a round trip between the UE and the network node, and wherein the second timer is a retransmission timer associated with a duration needed for the network node to transmit new control information.

14. The method of claim 11, wherein the UE is configured with a duration for at least one of the first timer or the second timer.

15. The method of claim 1, wherein the first time interval and the second time interval are in accordance with a discontinuous reception configuration.

16. The method of claim 1, wherein the UE is configured with a set of skipping procedures including the skipping procedure.

17. The method of claim 1, further comprising:
skipping monitoring the control channel during a third time interval of the time duration after the second time interval and before expiration of the time duration, wherein the third time interval corresponds to a reminder of the time duration after the first time interval and the second time interval.

18. A user equipment (UE) for wireless communication, comprising:
one or more memories; and
one or more processors coupled to the one or more memories, the one or more processors configured to:
receive, in a control channel and from a network node, control information including a bit field that identifies a time duration, of a set of time durations, to skip monitoring of the control information, wherein the UE is configured with the set of time durations;
identify, based at least in part on receiving the control information, the time duration of the set of time durations;
skip monitoring of the control channel during a first time interval of the time duration according to a skipping procedure, wherein the first time interval starts after transmitting negative acknowledgment feedback for a downlink transmission scheduled by the control information, and wherein the UE is configured with the skipping procedure; and
monitor the control channel during a second time interval of the time duration according to the skipping procedure.

19. The UE of claim 18, wherein the control information is received during an active period of a discontinuous reception operation or during a continuous reception operation.

20. The UE of claim 18, wherein the one or more processors are further configured to monitor the control channel starting from at least one of:
a next time period after the control information is received;
a next time period after a control region in which the control information is received;
a next time period after receiving the downlink transmission scheduled by the control information;
a next time period after transmitting an uplink transmission scheduled by the control information;
a next time period after transmitting the negative acknowledgment feedback for the downlink transmission; or
a next time period after a time offset that follows transmitting the uplink transmission.

21. The UE of claim 18, wherein the time duration is one or more transmission time intervals.

22. The UE of claim 18, wherein the one or more processors are further configured to:
monitor the control channel after the time duration; and
receive, in the control channel, new control information that identifies a retransmission of the downlink transmission or an uplink transmission.

23. The UE of claim 22, wherein the new control information provides an indication to skip monitoring of the control channel for a new time duration of the set of time durations.

24. The UE of claim 18, wherein the control channel is monitored, during the time duration, according to a modified configuration relative to a configuration for monitoring of the control channel outside of the time duration.

25. The UE of claim 24, wherein the modified configuration modifies at least one of:
a periodicity for monitoring the control channel;
a quantity of control channel candidates that are to be monitored; or
a transmission type of grants that are to be monitored in the control channel.

26. The UE of claim 18, wherein the one or more processors are further configured to:
receive, during the second time interval, new control information that identifies a retransmission of a downlink transmission or an uplink transmission and provides an indication to skip monitoring of the control channel for a new time duration of the set of time durations; and
skip monitoring of the control channel for the new time duration and before a configured expiration of the second time interval.

27. The UE of claim 18, wherein the one or more processors are further configured to skip monitoring of the control channel during a third time interval of the time duration that is after the second time interval.

28. The UE of claim 18, wherein the first time interval is associated with a first timer and the second time interval is associated with a second timer.

29. The UE of claim 28, wherein the first timer and the second timer are associated with a particular hybrid automatic repeat request process.

30. The UE of claim 28, wherein the first timer is a round trip timer associated with a duration of a round trip between the UE and the network node, and wherein the second timer is a retransmission timer associated with a duration needed for the network node to transmit new control information.

31. The UE of claim 28, wherein the UE is configured with a duration for at least one of the first timer or the second timer.

32. The UE of claim 18, wherein the first time interval and the second time interval are in accordance with a discontinuous reception configuration.

33. The UE of claim 18, wherein the UE is configured with a set of skipping procedures including the skipping procedure.

34. The UE of claim 18, wherein the one or more processors are further configure to:
skip monitoring the control channel during a third time interval of the time duration after the second time interval and before expiration of the time duration, wherein the third time interval corresponds to a reminder of the time duration after the first time interval and the second time interval.

35. A non-transitory computer-readable medium storing a set of instructions for wireless communication, the set of instructions comprising:
one or more instructions that, when executed by one or more processors of a user equipment (UE), cause the UE to:
receive, in a control channel and from a network node, control information control information including a bit field that identifies a time duration, of a set of time durations, to skip monitoring of the control information, wherein the UE is configured with the set of time durations;

identify, based at least in part on receiving the control information, the time duration of the set of time durations;

skip monitoring of the control channel during a first time interval of the time duration according to a skipping procedure, wherein the first time interval starts after transmitting negative acknowledgment feedback for a downlink transmission scheduled by the control information, and wherein the UE is configured with the skipping procedure; and monitor the control channel during a second time interval of the time duration according to the skipping procedure.

36. The non-transitory computer-readable medium of claim 35, wherein the control information is received during an active period of a discontinuous reception operation or during a continuous reception operation.

37. The non-transitory computer-readable medium of claim 35, wherein the one or more instructions further cause the UE to monitor the control channel starting from at least one of:
   a next time period after the control information is received;
   a next time period after a control region in which the control information is received;
   a next time period after receiving the downlink transmission scheduled by the control information;
   a next time period after transmitting an uplink transmission scheduled by the control information;
   a next time period after the negative acknowledgment feedback for the downlink transmission; or
   a next time period after a time offset that follows transmitting the uplink transmission.

38. The non-transitory computer-readable medium of claim 35, wherein the time duration is one or more transmission time intervals.

39. The non-transitory computer-readable medium of claim 35, wherein the one or more instructions further cause the UE to:
   monitor the control channel after the time duration; and
   receive, in the control channel, new control information that identifies a retransmission of the downlink transmission or an uplink transmission.

40. The non-transitory computer-readable medium of claim 39, wherein the new control information provides an indication to skip monitoring of the control channel for a new time duration of the set of time durations.

41. The non-transitory computer-readable medium of claim 35, wherein the control channel is monitored, during the time duration, according to a modified configuration relative to a configuration for monitoring of the control channel outside of the time duration.

42. The non-transitory computer-readable medium of claim 41, wherein the modified configuration modifies at least one of:
   a periodicity for monitoring the control channel;
   a quantity of control channel candidates that are to be monitored; or
   a transmission type of grants that are to be monitored in the control channel.

43. The non-transitory computer-readable medium of claim 35, wherein the one or more instructions further cause the UE to:

receive, during the second time interval, new control information that identifies a retransmission of a downlink transmission or an uplink transmission and provides an indication to skip monitoring of the control channel for a new time duration of the set of time durations; and skip monitoring of the control channel for the new time duration and before a configured expiration of the second time interval.

44. The non-transitory computer-readable medium of claim 35, wherein the one or more instructions further cause the UE to skip monitoring of the control channel during a third time interval of the time duration that is after the second time interval.

45. The non-transitory computer-readable medium of claim 35, wherein the first time interval is associated with a first timer and the second time interval is associated with a second timer.

46. The non-transitory computer-readable medium of claim 45, wherein the first timer and the second timer are associated with a particular hybrid automatic repeat request process.

47. The non-transitory computer-readable medium of claim 45, wherein the first timer is a round trip timer associated with a duration of a round trip between the UE and the network node, and wherein the second timer is a retransmission timer associated with a duration needed for the network node to transmit new control information.

48. The non-transitory computer-readable medium of claim 45, wherein the UE is configured with a duration for at least one of the first timer or the second timer.

49. The non-transitory computer-readable medium of claim 35, wherein the first time interval and the second time interval are in accordance with a discontinuous reception configuration.

50. The non-transitory computer-readable medium of claim 35, wherein the UE is configured with a set of skipping procedures including the skipping procedure.

51. The non-transitory computer-readable medium of claim 35, wherein the one or more instructions further causes the UE to:
   skip monitoring the control channel during a third time interval of the time duration after the second time interval and before expiration of the time duration, wherein the third time interval corresponds to a reminder of the time duration after the first time interval and the second time interval.

52. An apparatus for wireless communication, comprising:
   means for receiving, in a control channel and from a network node, control information including a bit field that identifies a time duration, of a set of time durations, to skip monitoring of the control information, wherein the apparatus is configured with the set of time durations;
   means for identifying, based at least in part on receiving the control information, the time duration of the set of time durations;
   means for skipping monitoring of the control channel during a first time interval of the time duration according to a skipping procedure, wherein the first time interval starts after transmitting negative acknowledgment feedback for a downlink transmission scheduled by the control information, and wherein the apparatus is configured with the skipping procedure; and means for monitoring the control channel during a second time interval of the time duration according to the skipping procedure.

53. The apparatus of claim 52, wherein the control information is received during an active period of a discontinuous reception operation or during a continuous reception operation.

54. The apparatus of claim 52, further comprising means for monitoring the control channel starting from at least one of:
   a next time period after the control information is received;
   a next time period after a control region in which the control information is received;
   a next time period after receiving the downlink transmission scheduled by the control information;
   a next time period after transmitting an uplink transmission scheduled by the control information;
   a next time period after transmitting the negative acknowledgment feedback for the downlink transmission; or
   a next time period after a time offset that follows transmitting the uplink transmission.

55. The apparatus of claim 52, wherein the time duration is one or more transmission time intervals.

56. The apparatus of claim 52, further comprising:
   means for monitoring the control channel after the time duration; and
   means for receiving, in the control channel, new control information that identifies a retransmission of the downlink transmission or an uplink transmission.

57. The apparatus of claim 56, wherein the new control information provides an indication to skip monitoring of the control channel for a new time duration of the set of time durations.

58. The apparatus of claim 52, wherein the control channel is monitored, during the time duration, according to a modified configuration relative to a configuration for monitoring of the control channel outside of the time duration.

59. The apparatus of claim 58, wherein the modified configuration modifies at least one of:
   a periodicity for monitoring the control channel;
   a quantity of control channel candidates that are to be monitored; or
   a transmission type of grants that are to be monitored in the control channel.

60. The apparatus of claim 52, further comprising:
   means for receiving, during the second time interval, new control information that identifies a retransmission of a downlink transmission or an uplink transmission and provides an indication to skip monitoring of the control channel for a new time duration of the set of time durations; and
   means for skipping monitoring of the control channel for the new time duration and before a configured expiration of the second time interval.

61. The apparatus of claim 52, further comprising means for skipping monitoring of the control channel during a third time interval of the time duration that is after the second time interval.

62. The apparatus of claim 52, wherein the first time interval is associated with a first timer and the second time interval is associated with a second timer.

63. The apparatus of claim 62, wherein the first timer and the second timer are associated with a particular hybrid automatic repeat request process.

64. The apparatus of claim 62, wherein the first timer is a round trip timer associated with a duration of a round trip between the apparatus and the network node, and wherein the second timer is a retransmission timer associated with a duration needed for the network node to transmit new control information.

65. The apparatus of claim 62, wherein the apparatus is configured with a duration for at least one of the first timer or the second timer.

66. The apparatus of claim 52, wherein the first time interval and the second time interval are in accordance with a discontinuous reception configuration.

67. The apparatus of claim 52, wherein the apparatus is configured with a set of skipping procedures including the skipping procedure.

68. The apparatus of claim 52, further comprising:
   means for skipping monitoring the control channel during a third time interval of the time duration after the second time interval and before expiration of the time duration, wherein the third time interval corresponds to a reminder of the time duration after the first time interval and the second time interval.

* * * * *